Patented May 28, 1940

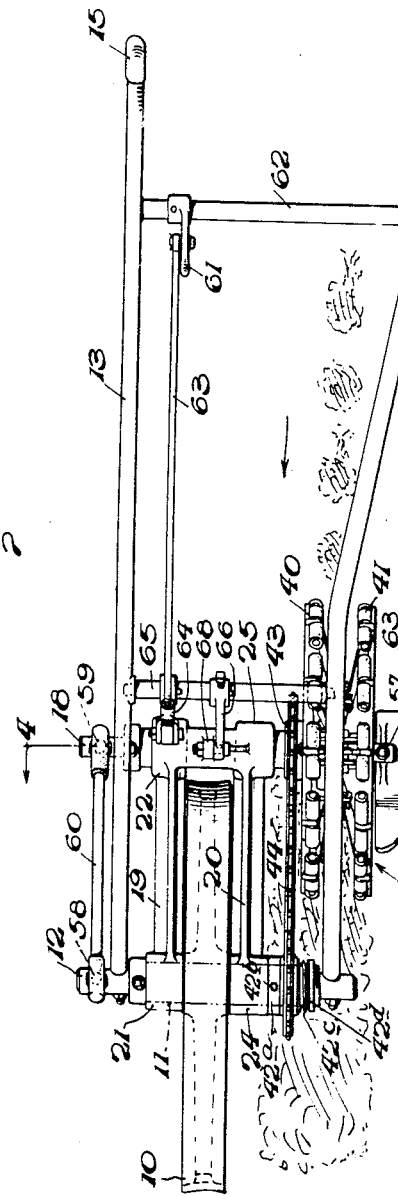

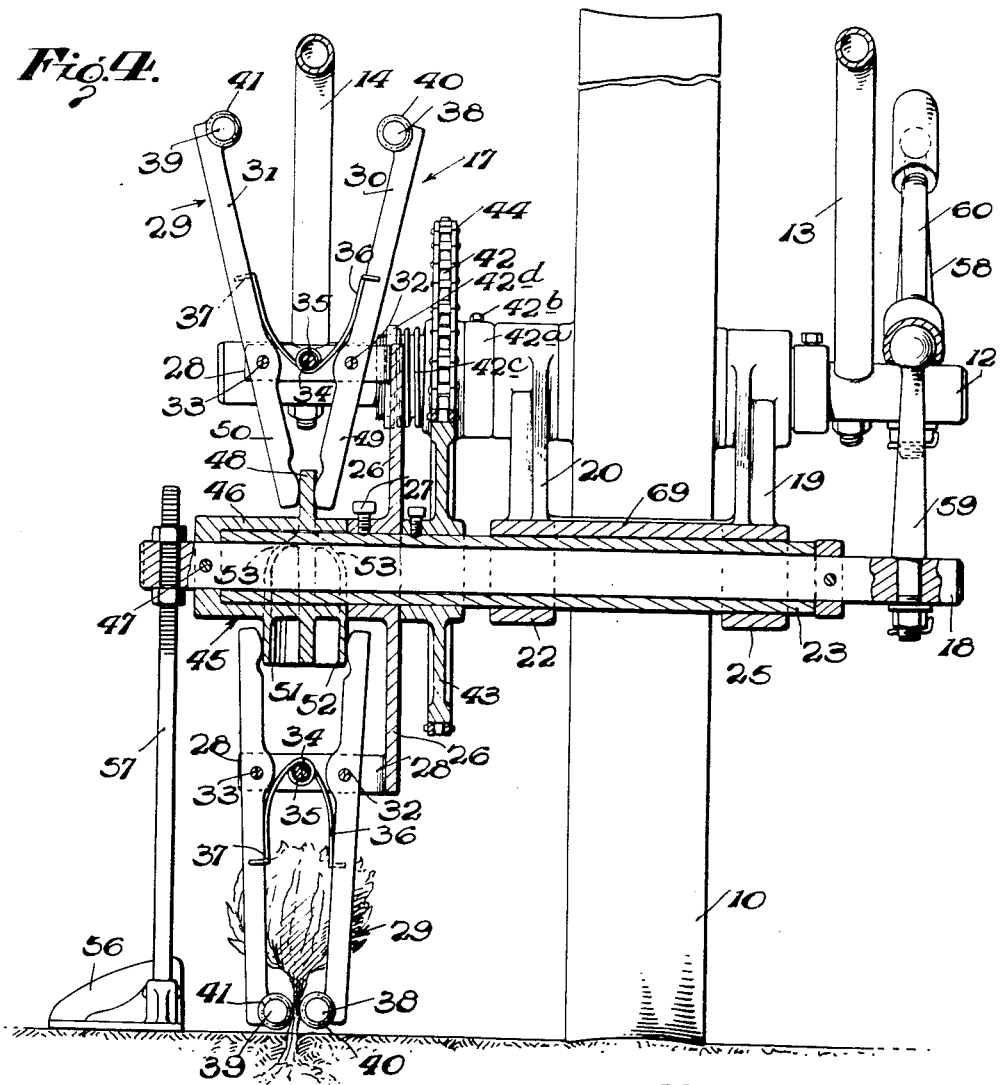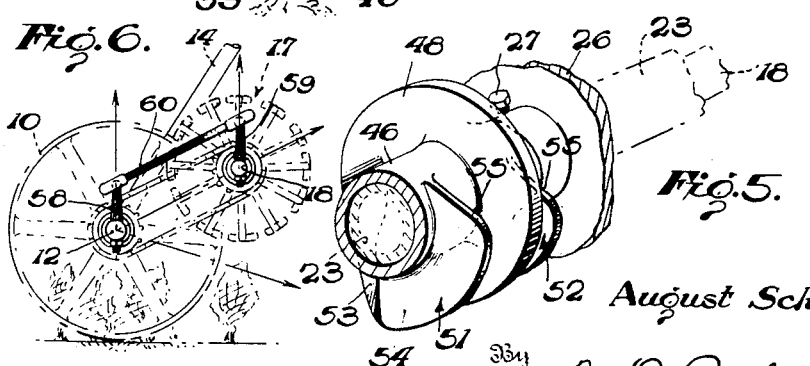

2,202,433

UNITED STATES PATENT OFFICE 2,202,433

PLANT THINNING MACHINE

August Schumacher, Brookline, Mass.

Application September 15, 1939, Serial No. 295,146

10 Claims. (Cl. 97—21)

This invention relates to agricultural apparatus and more particularly to a mechanism for automatically thinning plants.

Various types of plant thinning devices have been heretofore proposed for the purpose of automatically thinning young plants growing in alignment. The thinning out of young plants is a well known procedure and is necessitated by reason of the planting of an excess of seed in order to assure the sprouting and growing of a good crop. For the most part, the machines heretofore proposed have operated on a plowing principle, that is, have employed hoe members for chopping or hoeing out spaced groups of plants in order to effect the thinning operation. While this type of mechanism might be satisfactory for certain types of plants, it will be readily understood that the hoeing operation may expose portions of the roots of the remaining plants, in which case, such plants may die or suffer for lack of plant food, water, etc., because of the removal of the soil. Moreover, the hoeing of the soil unduly disturbs the ground contour and necessitates a subsequent cultivating operation in order to restore the soil hoed away from the row.

In manual thinning, the plants desired to be removed are merely grasped and pulled out, such procedure leaving the soil intact and avoiding the necessity of an immediate cultivation for the purpose of restoring the ground contour. However, such manual operations are tedious and require the expenditure of a great amount of labor.

One of the objects of the present invention is to provide a machine for thinning plants which will be so constituted as to avoid the objections and difficulties of the prior machines, while at the same time being capable of thinning plants in a manner similar to manual thinning, that is, without disturbing the soil about the roots of the remaining plants.

Another object of the invention resides in the provision of a machine for thinning plants wherein the action is such that spaced groups of plants may be frictionally gripped and withdrawn from the ground in a manner generally simulating manual thinning.

Still another object comprises the incorporation into the thinning machine, of certain safety mechanisms which shall be so constituted as to avoid damage to the parts in the event that foreign matter, such as stones, are encountered during the frictional gripping and thinning of the plants.

A further object is to provide in a machine of the foregoing character, a novel plant thinning element drivably connected to a ground engaging wheel, such element embodying a plurality of pairs of cooperating arms adapted to be urged into frictional engagement with the groups of plants desired to be thinned.

Another object resides in the provision of a novel arrangement of parts whereby frictional gripping and withdrawal of the plants to be thinned will be assured, irrespective of variations in ground level, and without the possibility of any hoeing action of the soil taking place.

A still further object is to provide a readily portable machine of the above type which may be readily and efficiently operated by a single operator and which comprises a compact arrangement of parts which lends itself to economy of manufacture.

Other objects and features of novelty will appear more fully hereinafter from a consideration of the following detailed description when taken in connection with the accompanying drawings illustrative of one form of the invention. It is to be expressly understood, however, that the drawings are employed for purposes of illustration only and are not to be taken as a definition of the limits of the invention, reference being had for this purpose to the claims appended hereto.

In the drawings, wherein similar reference characters refer to like parts throughout the several views:

Fig. 1 is a top plan view of a plant thinning machine constructed in accordance with the principles of the present invention;

Fig. 2 is a side view of the mechanism of Fig. 1;

Fig. 3 is a partial view in perspective of a portion of the thinning drum;

Fig. 4 is a transverse sectional view of the machine of Fig. 1 taken along line 4—4 of the latter;

Fig. 5 is a partial view in perspective of the cam mechanism forming a part of the thinning unit, and Fig. 6 is a diagrammatic view illustrating the adjustability of the thinning unit in accordance with a variation in ground level.

Referring more particularly to Figs. 1 and 2, a plant thinning mechanism constructed in accordance with the principles of the present invention is illustrated therein as including a ground engaging wheel 10 secured in any suitable manner to a sleeve 11, the latter being rotatably mounted upon a shaft 12. Preferably, a pair of supporting handles 13 and 14 are secured to the shaft 12 for moving the latter forwardly in order to move the wheel 10 over the area to be traversed and if desired, grip portions 15 and 16 may be associated with the outer ends of the handles for use in manual operation.

Positioned rearwardly of the wheel 10 and to one side thereof is a plant thinning unit 17 which is operable, during movement of the wheel 10 in a rectilinear path, to frictionally grip and withdraw from the ground, spaced plants growing in aligned relation. The aforesaid thinning unit 17 is supported by a shaft 18, the latter being connected to sleeve 11 as by means of a bracket including arms 19 and 20. As illustrated in Figs. 1 and 4, the arm 19 includes eyes 21 and 22 respectively surrounding sleeve 11 on shaft 12 and a sleeve 23 rotatably mounted on shaft 18. Arm 20 likewise includes eyes 24 and 25 also respectively surrounding sleeves 11 and 23. With such a construction it will be readily understood that shafts 12 and 18 are maintained in fixed spaced relation but said shafts are capable of movement, one with respect to the other.

Referring more particularly to Figs. 1, 3 and 4, the thinning unit 17 comprises a rotary drum 26, the hub of which is secured to the sleeve 23 as by a set srew 27. Extending laterally from the peripheral portion of the drum are a plurality of pairs of supporting arms 28, such arms being provided for the purpose of supporting plant gripping units 29. As will appear more particularly from Figs. 3 and 4, each of the plant gripping units 29 includes a pair of arms 30 and 31 pivotally mounted intermediate their ends between pairs of supporting arms 28 as by means of pins 32 and 33 respectively. Intermediate pins 32 and 33 is a pin 34, the latter being provided for mounting a spring 35 having arms 36 and 37 respectively associated with arms 30 and 31 and normally urging said arms in a direction tending to spread the outer ends thereof apart as illustrated in Figs. 3 and 4. For the purpose of frictionally gripping the plants to be thinned, the outer end portions of the arms 30 and 31 are provided with lateral extensions 38 and 39 to which suitable friction sleeves 40 and 41, formed of rubber or other desirable material, may be secured.

In order to cause rotation of the thinning drum 17 during movement of the mechanism over the ground, suitable drive mechanism is employed for interconnecting sleeves 11 and 23. As shown, see Figs. 1 and 4, such mechanism includes a driving sprocket 42 and a driven sprocket 43, the latter being secured to sleeve 23, such sprockets being interconnected as by means of a chain 44. Preferably, the driving sprocket 42 is secured to the sleeve 11 by means of a suitable type of friction clutch. In the form shown, such clutch includes a driving friction clutch member or collar 42a, secured to sleeve 11 as by means of a set screw 42b. The sprocket 42, rotatably mounted on sleeve 11, is urged into frictional driving engagement with member 42a by a spring 42c, the tension of which may be regulated by adjustment of a nut 42d, threadedly received by the lower threaded end of sleeve 11, Fig. 1. If desired, the adjacent sides of sprocket 42 and the driving friction member 42a may be provided with friction facings. With such a construction, it will be readily understood that upon movement of the ground engaging wheel 10, rotation will be imparted to the thinning drum 26 by means of sleeve 11, clutch member 42a, driving sprocket 42, chain 44 and the driven sprocket 43, it being borne in mind that the drum 26 is rigidly connected to the sleeve 23 carrying the driven sprocket 43.

For the purpose of effecting movement of the arms 30 and 31 of the thinning units 29 in such a direction as to move the outer portions of said arms into frictional engagement in order to grip the plants to be thinned, there is provided a stationary cam device 45, the latter including a hub 46, fixedly secured as by means of a set screw 47 to the shaft 18. Such cam device also includes a circular disc portion 48 cooperating with the inner ends 49 and 50 of the arms 30 and 31 throughout a substantial portion of the rotatable movement of the thinning drum. Formed integrally with the lower portion of the sleeve portion 46 or otherwise secured thereto and positioned on opposite sides of the disc 48, are a pair of cams 51 and 52, see Figs. 4 and 5, the function of said cams being to urge the inner end portions 49 and 50 apart in order that the outer end portions 38 and 39 may be engaged for the purpose of frictionally gripping the plants for thinning purposes, see Fig. 4. As will appear more particularly in Fig. 5, each of the cams is provided with a gradually contoured section 53 joining the surface of disc 48 with a substantially flattened portion 54 and the plane of connection between portions 53 and 54 is so positioned that the plant thinning units are in frictional engagement with the plants when said units reach their lowermost position. Moreover, the extent of the surface 54 is such that during continued movement of the mechanism over the ground, the frictional engagement between the lower ends of the plant thinning units is maintained until withdrawal of the plants from the ground is assured. At the trailing edge 55 of the cam surfaces 54, the inner ends 38 and 39 of the thinning units leave the cams 51 and 52 whereupon the springs 35 are effective to promptly restore the arms 30 and 31 to the position shown in Fig. 3 whereupon the plants withdrawn by each respective unit are released and dropped to the ground. At this stage of the operation, the opening of the units through the action of springs 35 will be limited by the returned engagement of the inner ends 49 and 50 of the arms 30 and 31 with the disc 48.

During the operation of the thinning machine, foreign material, such as stones, for example, may be gripped by the thinning units as the outer ends thereof are urged into engagement by the cams 51 and 52. If the machine continues to move forwardly under these conditions, undue stresses may be placed upon ends 49 and 50 of arms 30 and 31 by the cams 51 and 52. In such event, frictional engagement between the driving collar 42a and the driving sprocket 42 is such that the clutch constituted by these parts will slip, thus interrupting the drive to the thinning unit. As a further safety feature, the cams 51 and 52 may be made of resilient material in order that they may yield in the event that foreign material should cause excessive pressure between the cams and the inner ends of the arms of the thinning units.

As heretofore stated, the shaft 18 is so connected to shaft 12 as by means of arms 19 and 20, as to be capable of relative movement with respect thereto. Such a construction enables the thinning unit to readily adapt itself to irregularities in ground level. It may be here observed that a suitable skid 56 may be adjustably secured by supporting rod 57 to the shaft 18 for the purpose of contacting the ground beside each row of plants and thus properly gauging the distance between the ground and the thinning units when the latter become engaged. This construction insures that when the thinning units are engaged, the plants will be frictionally gripped slightly above the surface of the ground as clearly illustrated in Fig. 4. In view of the movability of the thinning unit and supporting shaft therefor with respect to the ground, it is highly desirable to maintain proper angular relationship between shafts 12 and 18. This is necessary in view of the fact that shaft 18 carries the cam 45 for determining the timing of the operation of the thinning units and it will be readily understood that in the event the shaft 18 and unit supported thereby are raised or lowered with respect to shaft 12, the timing of the closing and opening of the thinning units would be varied if the angular relationship between shafts 12 and 18 were not maintained.

In order to effect the above desirable result, the shaft 12 has rigidly secured to the outer end thereof, Figs. 4 and 6, an upstanding arm 58.
Shaft 18 likewise has rigidly secured to the outer end thereof an upstanding arm 59. The free ends of the aforesaid arms are interconnected by a link or aligning bar 60, the ends of said link connected to the arms 58 and 59 being so constructed that relative movement therebetween may take place. A well known type of ball and socket joint, see Fig. 4, may be utilized for these connections. With the above named interconnection between shafts 12 and 18, it will be readily apparent, see Fig. 6, that the angular relationship between shafts 12 and 18 will be maintained constant irrespective of the upward or lowered movement of the thinning unit with respect to the ground engaging wheel 10. Thus the timing of the operation of the thinning unit will not be disturbed as variations in ground level are encountered by the skid 56 of the mechanism.

It may be found desirable at certain times to lift the thinning unit supported by shaft 18 free of the ground, as for example, when turning the machine around at the end of a row. Means are provided for accomplishing this result, such means including a manually operable lever 61 rotatably mounted upon an arm 62 supported by arms 13 and 14. The lever 61 is connected to rod 63, the latter being in turn connected to an arm 64 mounted upon rod 65 rotatably supported on arms 13 and 14. Rod 65 in turn has secured thereto a lever 66, the free end of which is slotted as at 67 and connected to a member 68 secured to sleeve 69 interconnecting eyes 22 and 25. Thus, manual operation of lever 61 will draw rod 63 to the right, as viewed in Fig. 1, in order to rock arm 64 and lever 66 in a clockwise direction, see Fig. 2, for the purpose of raising shaft 18 and members secured thereto.

There has thus been provided by the present invention a novel thinning machine for thinning plants in aligned rows. The construction of the device is such that a single operator may readily control the operation thereof and the parts are furthermore so arranged that the plants are frictionally gripped and removed from the ground without disturbing the soil about the roots of the plants which remain in the ground and which are positioned between the thinning units. The provision of the aligning mechanism interconnecting shafts 12 and 18 insures that the angularity between these shafts will be maintained irrespective of irregularities in ground levels. Thus, the thinning unit is readily adjustable to situations where slight variations in ground level are encountered without the danger of any irregularities in the thinning operation. It is to be further pointed out that the incorporation of the friction driving clutch, as well as forming the spreading cams of resilient material, avoids all possibility of damage to the parts of the machine in the event that the thinning units grip any foreign materials, such as stones, for example.

While one embodiment of the invention has been disclosed and described herein, it will be readily understood that the invention is not limited thereto but is capable of a variety of expressions as will be readily understood by those skilled in the art. Reference will, therefore, be had to the appended claims for a definition of the limits of the invention.

What is claimed is:

1. A plant thinning machine comprising a shaft having a pair of supporting handles secured thereto, a sleeve rotatably mounted on the shaft, a ground engaging wheel secured to said sleeve, a second shaft spaced from the first shaft, a second sleeve rotatably mounted on said second shaft, a driven member secured to said second sleeve, means including a friction clutch for drivably connecting said driven member and said first named sleeve, a drum connected with the driven member and provided with a plurality of cooperating pairs of arms extending from the peripheral portion thereof in a direction parallel to said second shaft, a pair of thinning members pivotally mounted intermediate their ends between each cooperating pair of arms, each of said thinning members having their inner ends extended toward said second shaft, a circular cam secured to said second shaft and having a portion positioned between the inner ends of all of the cooperating pairs of said thinning members, resilient means normally urging apart the outer ends of each cooperating pair of thinning members and maintaining the inner ends of said members in contact with said cam, and means on said cam for spreading apart the inner ends of said members during a portion of each revolution of the drum in response to movement of said wheel over the ground and causing the outer ends of said members to be frictionally engaged.

2. A plant thinning machine comprising a shaft having a pair of supporting handles secured thereto, a ground engaging wheel rotatably mounted on the shaft, a second shaft spaced from the first shaft, a sleeve rotatably mounted on said second shaft, a driven member secured to said sleeve, means for drivably connecting said driven member and said wheel, a drum connected with the driven member and provided with a plurality of cooperating pairs of arms extending from the peripheral portion thereof in a direction parallel to said second shaft, a pair of thinning members pivotally mounted intermediate their ends between each cooperating pair of arms, each of said thinning members having their inner ends extended toward said second shaft, a circular cam secured to said second shaft and having a portion positioned between the inner ends of all of the cooperating pairs of said thinning members, resilient means normally urging apart the outer ends of each cooperating pair of thinning members and maintaining the inner ends of said members in contact with said cam, and means on said cam for spreading apart the inner ends of said members during a portion of each revolution of the drum in response to movement of said wheel over the ground and causing the outer ends of said members to be frictionally engaged.

3. A plant thinning machine comprising a shaft having a pair of supporting handles secured thereto, a ground engaging wheel rotatably mounted on the shaft, a second shaft spaced from the first shaft, a sleeve rotatably mounted on said second shaft, a driven member secured to said sleeve, means including a friction clutch for drivably connecting said driven member and said wheel, a drum connected with the driven member and provided with a plurality of cooperating pairs of arms extending from the peripheral portion thereof in a direction parallel to said second shaft, a pair of thinning members pivotally mounted intermediate their ends between each cooperating pair of arms. each of said thinning members having their inner ends extended toward said second shaft, a circular cam secured to said second shaft and having a portion positioned between the inner ends of all of the cooperating pairs of said thinning members, resilient means normally urging apart the outer ends of each cooperating pair of thinning members and maintaining the inner ends of said members in contact with said cam, and yieldable cam means on said cam for spreading apart the inner ends of said members during a portion of each revolution of the drum in response to movement of said wheel over the ground and causing the outer ends of said members to be frictionally engaged, said cam means being yieldable to prevent damage to said members in the event the outer ends thereof grip non-yieldable foreign objects during their closing action.

4. A plant thinning machine comprising a frame having a ground engaging wheel rotatably mounted thereon, a plant thinning mechanism drivably connected with said wheel and mounted on said frame, said mechanism including a plurality of cooperating pairs of pivotally mounted thinning members having inner and outer ends, resilient means normally tending to spread apart the outer ends of said members, and yieldable cam means cooperating with the inner ends of said members for moving the latter to bring the said outer ends into frictional engagement.

5. A plant thinning machine comprising a frame having a ground engaging wheel rotatably mounted thereon, a plant thinning mechanism mounted on said frame, said mechanism including a plurality of cooperating pairs of pivotally mounted thinning members having inner and outer ends, resilient means normally tending to spread apart the outer ends of said members, cam means cooperating with the inner ends of said members for moving the latter to bring the said outer ends into frictional engagement, and means including a friction clutch for drivably connecting said wheel and mechanism.

6. A plant thinning machine comprising a frame having a ground engaging wheel rotatably mounted thereon, a plant thinning mechanism drivably connected with said wheel and mounted on said frame, said mechanism including a plurality of cooperating pairs of pivotally mounted thinning members having inner and outer ends, resilient means normally tending to spread apart the outer ends of said members, cam means carried by the frame and cooperating with the inner ends of said members for moving the latter apart to bring the said outer ends into frictional engagement, and a guide member carried by the frame and adapted to contact the ground, said guide member spacing the outer ends of said thinning members from the ground to assure a frictional gripping of the plants to be thinned at a point above the surface of the ground.

7. A plant thinning unit for use in a plant thinning mechanism comprising a circular disk having a plurality of pairs of spaced arms projecting from said disk at the peripheral portion thereof and at right angles to the plane of the disk, a pair of thinning members pivotally mounted intermediate their ends between each pair of arms, and a spring mounted on each of said pairs of arms and having its opposite ends associated with the thinning members of each respective pair, said springs normally urging the thinning members apart.

8. A plant thinning unit for use in a plant thinning mechanism comprising a circular disk having a plurality of pairs of spaced arms projecting from said disk at the peripheral portion thereof and at right angles to the plane of the disk, a pair of thinning members pivotally mounted intermediate their ends between each pair of arms, each of said thinning members being provided with oppositely extending and aligned plant gripping elements at the outer ends thereof, said elements being located in a plane parallel to the plane of said disk, and a spring mounted on each of said pairs of arms and having its opposite ends associated with the thinning members of each respective pair, said springs normally urging the thinning members apart.

9. A plant thinning machine having a shaft, a ground engaging wheel rotatably mounted on the shaft, a second shaft, means including a frame rotatably mounted on each of said shafts for connecting them in spaced relation, a plant thinning unit rotatably mounted on said second shaft, a cam fixedly secured to said second shaft for controlling the operation of said unit, a height gauging member secured to said second shaft and adapted to maintain at all times the latter and unit mounted thereon a predetermined distance above the ground, and means connecting said first and second shafts for maintaining constant angular relationship therebetween irrespective of movement of the second shaft with respect to the first shaft caused by variations in ground level.

10. A plant thinning machine having a shaft, a ground engaging wheel rotatably mounted on the shaft, a second shaft, means including a frame rotatably mounted on each of said shafts for connecting them in spaced relation, a plant thinning unit rotatably mounted on said second shaft, a cam fixedly secured to said second shaft for controlling the operation of said unit, a skid secured to said second shaft and adapted to contact the ground for maintaining at all times the second shaft and unit a predetermined distance above the ground, a pair of parallel arms, one connected to the first shaft and the other connected to the second shaft, and a link pivotally connected to the free ends of said arms.

AUGUST SCHUMACHER.